United States Patent [19]

Amano et al.

[11] Patent Number: 5,246,163
[45] Date of Patent: Sep. 21, 1993

[54] METHOD OF APPLYING QUICK SETTING SPRAY MATERIALS

[75] Inventors: Tokimoto Amano; Takao Takemoto, both of Aichi, Japan

[73] Assignee: Toagosei Chemical Industry Co., Ltd., Tokyo, Japan

[21] Appl. No.: 718,475

[22] Filed: Jun. 20, 1991

[30] Foreign Application Priority Data

Jun. 20, 1990 [JP] Japan .................. 2-161514

[51] Int. Cl.$^5$ .............................. B05B 7/04
[52] U.S. Cl. ........................ 239/1; 239/429; 239/433; 239/10; 366/3; 366/10
[58] Field of Search ............. 239/8, 9, 10, 429, 430, 239/433, 1; 366/3, 10, 341

[56] References Cited

U.S. PATENT DOCUMENTS

| | | | |
|---|---|---|---|
| 2,075,867 | 4/1937 | Sampel | 239/430 |
| 3,601,318 | 8/1971 | Gehring | 239/430 |
| 3,758,034 | 9/1973 | Broadfoot | 239/9 |
| 3,957,209 | 5/1976 | Thomson | 239/429 |
| 4,046,357 | 9/1977 | Twitchell | |
| 4,239,397 | 12/1980 | Sandell et al. | 239/430 |
| 4,264,212 | 4/1981 | Tookey | 366/3 |
| 4,275,836 | 6/1981 | Egger | 239/9 |
| 4,796,814 | 1/1989 | Klemm et al. | 239/430 |
| 4,815,860 | 3/1989 | Deuse | 366/10 |
| 4,824,022 | 4/1989 | Hillemeier et al. | 239/9 |
| 4,844,340 | 7/1989 | Miyata et al. | 239/9 |
| 4,931,098 | 6/1990 | Danielssen et al. | 366/3 |

FOREIGN PATENT DOCUMENTS

| | | | |
|---|---|---|---|
| 0236022 | 5/1986 | Fed. Rep. of Germany | 239/433 |
| 0250913 | 10/1987 | Fed. Rep. of Germany | 239/433 |
| 1376164 | 12/1974 | United Kingdom | 239/430 |

OTHER PUBLICATIONS

*ACI Journal,* No. 3, pp. 39–42, Oct. 1990.
*Guideline on Shotcrete,* Osterreichischer Betonverein, Jan. 1990.

*Primary Examiner*—Andres Kashnikow
*Assistant Examiner*—Christopher G. Trainor
*Attorney, Agent, or Firm*—Sughrue, Mion, Zinn, Macpeak & Seas

[57] ABSTRACT

A method of applying a quick setting spray material is disclosed, wherein a cement-containing principal composition is supplied into a feed pipe and sprayed through a nozzle and an aqueous solution of a (meth)acrylate as a set accelerating agent is supplied into the principal composition at a linear speed of 0.5 to 50 m/sec through at least two supply pipes that are connected to the feed pipe in a position within one meter behind the tip of the nozzle in such a manner that extended axes of the supply pipes cross each other within the feed pipe and wherein the at least two supply pipes form a supply angle of 30 to 90 degrees with respect to the direction at which the principal composition flows, whereafter the principal composition and the set accelerating agent are jetted from the nozzle.

6 Claims, 1 Drawing Sheet

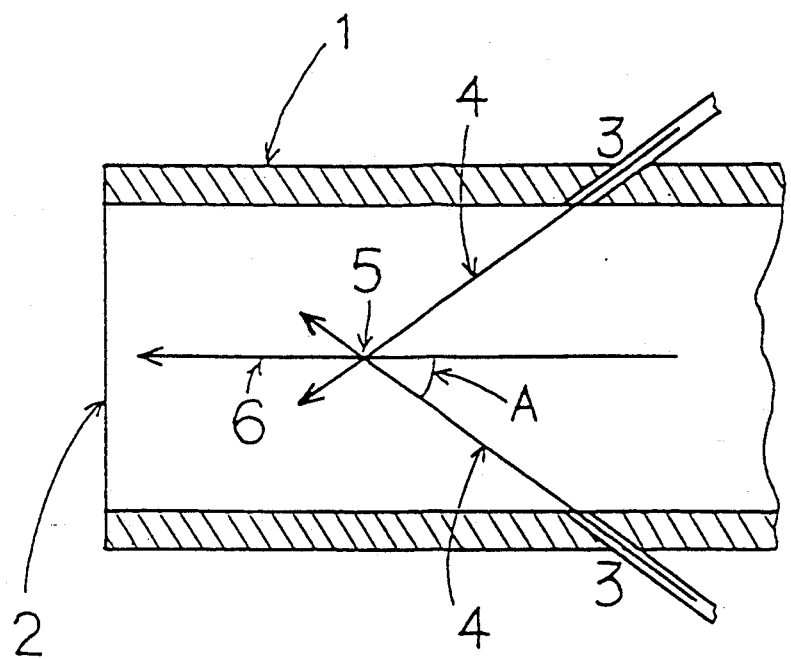

METHOD OF APPLYING QUICK SETTING SPRAY MATERIALS

FIELD OF THE INVENTION

This invention relates to an effective method of applying quick setting spray materials whereby various procedures such as the repair of damage to structures, protection of reinforcing steel bars and the reinforcement and protection of structural bodies in the case of repairing tunnels for roads, railroads, water conduits and the like, reservoirs, continuous underground walls, floor slabs, floor systems, bridges, bridge piers and bridge abutments, as well as the reinforcement of ordinary ground soil and base rocks, particularly in the building of stable protective walls on the surfaces of walls that contain free water originating from spring water and running or flowing water, can be accomplished within a short time. The method of the present invention will find extensive use in the civil engineering and architectural fields.

BACKGROUND OF THE INVENTION

Quick setting mortars, emulsion miscible polymer cement mortars and polymer mortars are well known materials for use in repairing structures. Quick setting mortars are characterized by a shorter set time and are prepared by adding alkaline set accelerating agents, primarily of calcium aluminate, alkali metal aluminates, alkali metal carbonates, etc., to a dry or wet mortar mix. However, in almost all cases, the added components have a smaller bond strength than the cement itself and their durability is also poor. Polymer cement mortars exhibit strong adhesion to structural bodies on account of the incorporated resins but since they harden very slowly, satisfactory adhesion to structural bodies cannot be achieved if high strength is required within a short period of time or if water is oozing out of the substrate. Materials based on polymer mortars are not only adjustable in hardening time but they also exhibit strong adhesion to structural bodies. However, many of those materials fail to adhere to wet surfaces and even if they can be bonded to wet surfaces, they have to be applied by troweling which does not have high operational efficiency per unit time.

Unlike such repair materials, cements having both aggregates and set accelerating acrylates or methacrylates can harden within very short times of one minute or less, even if they are applied to structures containing much free water, and, of course, harden quickly on ordinary structures, and develop high strength after hardening. A repair material made of such a composition was first disclosed in JP-A-61-117148 (the term "JP-A-" as used herein means an "unexamined published Japanese patent application") and is now in common use.

While repair materials of this type can be applied by various methods, two common approaches are described in JP-A-58-27992, JP-A-57-209366 and JP-A-58-143098. One method is a wet process in which a covering material composed of cement and aggregates is mixed with water to form a liquid mixture (slurry) which is combined with an aqueous solution of the set accelerating agent in a spray nozzle, from which the combined material is sprayed; and the other method is a dry process in which a powder mixture consisting of the covering material (cement plus aggregates) and the set accelerating agent is combined with water in a spray nozzle from which the combined material is sprayed.

In the wet method of applying repair materials that use acrylates or methacrylates (which are hereafter collectively referred to as (meth)acrylates), an aqueous solution of (meth)acrylates is added to cement and aggregates or a mixture thereof with water and the resulting blend is sprayed by means of a conventional spray system and nozzle. This conventional method, however, has various problems. For example, the blend when sprayed onto a wall can "rebound" excessively from the wall surface. Also, scale may be deposited in an high amount on the interior sides of the nozzle. Since the removal of deposited scale is time-consuming, the operational efficiency of this wet process may not be high. Further, the spray nozzle can be easily clogged by the scale.

There are also problems associated with the inherent nature of the work of repairing deteriorated or damaged structures, i.e., often insufficient time is allowed for such repair work. As is typical in the case of repairing railroad tunnels, the work must be started by turning off the electric power after the last train for the day and it must be completed before the power is turned on the next morning, and it is essential that the necessary strength of the repair material be developed by the time the first train comes. Such limitations also apply to jobs such as protecting the face of slopes, and the job must be completed within a predetermined time period as is often the case for protecting the sloping faces of dams. Under these circumstances, there has developed a great demand for a spray method that can be completed within a short time, that insures strong adhesion to structural bodies within a very short time and that enables structures to be protected and reinforced within a short time. However, the existing methods are not always capable of achieving repair over a satisfactory area per unit time and, in addition, considerable time is often required for the development of the desired strength.

SUMMARY OF THE INVENTION

An object, therefore, of the present invention is to solve those problems of the prior art by providing a spray method that can be practiced advantageously from both the technical and economic viewpoints and which is particularly effective for repair work.

As a result of intensive studies to attain this object, the present inventors found an efficient method of applying a quick setting spray material by which a principal composition containing cement can be hardened in a period of time of no more than 30 seconds, usually within 10 seconds, to strongly adhere to substrates such as concrete, base rocks and bricks, and which exhibits the ability of protecting and reinforcing structures in a short period of time after hardening, and which method involves only slight "rebounding" of the spray material from a surface on which it is sprayed and when also involves minimum clogging of a nozzle.

The present invention provides a method of applying a quick setting spray material comprising (i) a cement-containing principal composition and (ii) a set accelerating agent comprising an aqueous solution of at least one (meth)acrylate, in which method the principal composition is supplied into a feed pipe and sprayed through a nozzle and the set accelerating agent is supplied into the principal composition at a linear speed of 0.5 to 50 m/sec through at least two supply pipes that are connected to the feed pipe in a position within one meter behind the tip of the nozzle for the spray material in such a manner that extended axes of the supply pipes cross each other within the feed pipe and wherein the at least two supply pipes form a supply angle of 30 to 90 degrees with respect to the direction at which the principal composition flows, whereafter the principal composition and the set accelerating agent are jetted from the nozzle.

BRIEF DESCRIPTION OF THE DRAWING

The figure is a schematic cross section of a feed pipe for spray material, that is equipped with supply pipes through which an aqueous solution of a (meth)acrylate is added to a cement-containing principal composition in accordance with the present invention.

DETAILED DESCRIPTION OF THE INVENTION

The present invention is described below in detail.

Principal composition

The principal composition used as the major component of the spray material to be applied by the method of the present invention is chiefly composed of cement and supplemented with aggregates and optionally added water.

Cement

Any kind of cements can be used in the present invention as exemplified by normal Portland cements, high early strength Portland cements, calcium aluminate cements, Portland blast furnace slag cements and white cements. From the viewpoints of economy and availability, common normal Portland cements will suffice. The cements may be mixed with water to form cement slurries or they may be directly used in a powder form. From the viewpoints of hardening time, the strength of the hardened cement and the strength of adhesion to base rocks, the cements are preferably used in a powder form.

Aggregates

Aggregates are added to the cements either as fillers or for reinforcing and increasing the stability of the cements. Common aggregates for cements can be used in the present invention as exemplified by sand (generally having a particle diameter of less than 5 mm), small gravel or small crushed stone (generally having a particle diameter of 5 to 25 mm), artificial light weight aggregates, fly ash, fumed silica and blast furnace slag. These aggregates may be used in combination with fibrous materials such as steel fibers, carbon fibers, glass fibers and mineral fibers. The fibrous materials generally have a width (short axis) of 1 mm or less and a length (long axis) more than two times that of the width.

The amount of aggregates used is desirably not more than five times the weight of the cement, but preferably not less than one second of the weight of the cement. If aggregates are to be used in combination with fibrous materials, the sum is desirably not more than five times the weight of the cement, and the amount of the fibrous materials is preferably not more than 2 wt % based on the weight of the cement.

The principal composition is prepared by mixing cement and aggregates using a conventional mixer such as a concrete mixer and a mortar mixer and then fed to a spray machine.

Set accelerating agent

(Meth)acrylate

One or more (meth)acrylates are used in the present invention as set accelerating agents to achieve a marked improvement in the strength of adhesion to substrates. Preferred (meth)acrylates include salts of acrylic acid or methacrylic acid with alkali metals, alkaline earth metals and aluminum. More preferred are salts of sodium, magnesium, calcium or aluminum.

(Meth)acrylates are used as aqueous solutions since the amount thereof can be controlled easily and because the spray material will harden in a short time. The concentration of (meth)acrylates in the aqueous solution is preferably at least 10 wt %, more preferably at least 20 wt %. If the concentration of (meth)acrylates in the aqueous solution is less than 10 wt %, the content of polymerized (meth)acrylates in the hardened cement is too small to insure satisfactory quick setting and adhesive strength. Further, the initial strength that is developed after hardening will also decrease, whereby it becomes difficult to attain the objects of the present invention. The concentration of (meth)acrylates can be increased up to the level that will not cause the (meth)acrylates to precipitate, and saturated aqueous solutions of (meth)acrylates can be used as long as the (meth)acrylates do not precipitate.

Oxidizing agent

The (meth)acrylates used in the present invention are polymerized into a jelly to form water-insoluble polymers, which impart a quick setting property to the mixture of the cement and aggregates, thereby insuring strong adhesion to substrates. Catalysts for redox polymerization are preferably used in polymerizing the (meth)acrylates. An oxidizing agent which is a component of the redox polymerization catalyst is capable of polymerizing the (meth)acrylates even if it is used alone. Specific examples of the oxidizing agent include water soluble azobis compounds such as azobiscyanoisovaleric acid, hydrogen peroxide and those water soluble compounds which generate hydrogen peroxide. Compounds that generate hydrogen peroxide are exemplified by sodium percarbonate, sodium perborate, calcium peroxide, barium peroxide, and persulfates such as ammonium persulfate, potassium persulfate and sodium persulfate. Persulfates are particularly preferred. Preferably, the oxidizing agents are preliminarily dissolved in water so that they can be added to (meth)acrylates in the form of an aqueous solution before they are added to the principal composition. The concentration of the oxidizing agent in the aqueous solution is generally from 10 to 30 wt %. The oxidizing agents may be added either simultaneously with or separately from the (meth)acrylates. If desired, they may be added to the principal composition either in the form of a powder or as an aqueous solution or suspension.

As already mentioned, the oxidizing agent, even if it is used alone, is capable of polymerizing the (meth)acrylates in a short time. However, if it is desired to further shorten the hardening time, reducing agents are preferably used. If reducing agents are to be used in combination with the oxidizing agents, it is desirable that either the oxidizing agent or the reducing agent be added to the aqueous solution of the (meth)acrylate while the other is added to the principal composition. When added to the principal composition, the oxidizing agent or reducing agent must be thoroughly mixed with the principal composition.

The oxidizing agent is desirably used in an amount of 5 to 20 wt % based on the weight of the (meth)acrylate.

Reducing agent

The reducing agent(s) used in combination with the oxidizing agent(s) are preferably soluble in water. Exemplary reducing agents include: amines such as diethanolamine, triethanolamine, hydrazine, hydroxylamine, dimethylaminopropionitrile, dimethylaminoethanol, dimethylaminopropanol, piperazine and morpholine; salts of those amines such as methylamine sulfate; ferrous salts such as ferrous ammonium sulfate; alkali metal sulfites such as sodium sulfite; thiosulfates such as sodium thiosulfate; thiourea; sodium isoascorbate; and Rongalit (formaldehyde-sodium sulfoxylate dihydrate). Those reducing agents may be used either singly or as admixtures thereof.

The reducing agent is desirably used in an amount of 1 to 20 wt % based on the weight of the (meth)acrylate. The combination of the oxidizing and reducing agents and the proportions of the combined oxidizing and reducing agents will influence the hardening time and the initial hardness of the hardened cement and may be selected as appropriate for such factors as the environment in which the hardened cement is to be used and the temperature of use. In general, the weight ratio of the oxidizing agent to the reducing agent is 1/1 to 10/1.

Proportions of components

The (meth)acrylate(s) is/are preferably used in amounts of 0.009 to 0.6 part by weight, more preferably 0.010 to 0.5 part by weight, per part by weight of the solids constituent of the principal composition. If the amount of the (meth)acrylates is smaller than 0.009 part by weight, it is difficult to insure strong bonding of the cement and aggregate to the desired surface(s), and failure to obtain a sturdy solidified product will frequently occur. In addition, the resulting spray material is too porous to provide a satisfactory ability of water proofing. Further, the adhesion to concrete, base rocks and ground soil can potentially be insufficient. If the amount of the (meth)acrylates is greater than 0.6 part by weight, the cement hydrate will not exhibit the necessary strength in an effective manner and it becomes difficult to form a sturdy solidified product.

The time for the spray material to harden can be reduced to about 30 seconds or less, and even to 10 seconds or less if required, by properly adjusting the kinds and amounts of the oxidizing and reducing agents used. If desired, the hardening time can be reduced to about one second.

Method of use

Any conventional dry spray machine can be used for feeding the principal composition. Examples of such conventional spray machines include the machine that is used in the implementation of the New Austrian Tunneling Method (NATM) and the machine that is used in the work of protecting the sloping surfaces of mountains. The principal composition is fed into a feed pipe by supplying air together. The amount of air supply is generally 5 to 12 m$^3$/min.

In the present invention, the cement-containing principal composition is supplied into a feed pipe (including a nozzle pipe) for the spray material whereas an aqueous solution of (meth)acrylate is blown into the principal composition by being supplied into the feed pipe for the spray material through at least two and preferably up to twelve supply pipes that are connected to the feed pipe at a position within one meter but preferably not less than 5 cm behind the tip of the nozzle, where the at least two supply pipes form a supply angle in the range of 30 to 90 degrees, preferably 30 to 70 degrees, with respect to the direction in which the principal composition is flowing. The supply angle that extended axes of the supply pipes form with the direction in which the principal composition is flowing is indicated by A in the Figure. If the supply pipes 3 for the set accelerating agent are provided on the feed pipe 1 at a position more than one meter behind the tip of the nozzle 2, the chance of the nozzle being clogged will increase. If the supply angle A for the aqueous solution of (meth)acrylate with respect to the direction 6 in which the principal composition is flowing is less than 30 degrees, the aqueous solution will insufficiently mix with the principal composition. If the supply angle A exceeds 90 degrees, the hardened cement formed by contact between the principal composition and the (meth)acrylate tends to be deposited in areas close to the outlet of each supply pipe 3 and this can cause clogging of the nozzle.

The supply angle of the supply pipes may be the same or different from each other as long as extended axes of the supply pipes cross each other within the feed pipe. In the Figure, the extended axes 4 of the supply pipes 3 cross each other at point 5. The crossing point is not necessarily at the center of the feed pope 1, but it is preferably within the region around the center at a distance therefrom of not more than 20% of the inner diameter of the feed pipe 1.

It is necessary in the present invention that the aqueous solution of (meth)acrylate be supplied at a linear speed of 0.5 to 50 m/sec. If the supply speed is less than 0.5 m/sec, the aqueous solution of (meth)acrylate will insufficiently mix with the principal composition. If the supply speed exceeds 50 m/sec, the inside surfaces of the nozzle will wear so extensively that it becomes difficult to apply the spray material in a large amount.

In the present invention, the aqueous solution of (meth)acrylate must be supplied through at least two supply pipes. If only one supply pipe is used, fines in the principal composition will increase the chance of the nozzle being clogged and, in addition, rebounding from the work surface on spraying will also increase.

If the aqueous solution of (meth)acrylate is added by the method described above, it can be mixed with the principal composition so efficiently that the hardened cement will have uniform physical properties that do not vary with the position where it is applied. Further, the hardened cement can be sprayed with minimum deposition on the walls of the nozzle.

Depending on the state of the wall surface to be sprayed, various auxiliary operations can be performed including the installation of lock bolts, reinforcing steel bars or mesh screens. The thickness of the spray coat varies with the specific object of the job, and spray coating can be repeated where the final thickness of 2 cm or more is desired.

If necessary for the practice of the present invention, the spray material may be applied with water being added in a position that is further behind the position where the aqueous solution of (meth)acrylate is added (i.e., upstream therefrom) but which is within 2 m from the tip of the nozzle. Alternatively, the principal composition may be sprayed with water being preliminarily added in an amount that enables the principal composition to be supplied into the feed pipe.

Needless to say, more efficient spraying can be accomplished if the nozzle is made of materials that reduce the chance of deposition of the hardened cement.

In accordance with the method of the present invention, the hardened product made of the (meth)acrylate and cement will adhere to the substrate within a short period with sufficient strength to effectively protect structural bodies. Thus, the method is useful for the repair of various structures. Further, the method results in minimum rebounding of the spray material and enables the intended spray work to be accomplished consistently with minimum occurrence of any problems such as clogging of the nozzle and, as a result, structures can be repaired in a shorter time and in an efficient way by the method of the present invention.

The following examples are provided for the purpose of further illustrating the present invention but are in no way to be taken as limiting.

EXAMPLE 1

A spray test was conducted using a cement containing principal composition prepared by mixing cement, river sand, gravel and a reducing agent. The formulation of the principal composition is shown in Table 1. The cement was normal Portland cement (defined in Japanese Industrial Standard (JIS) R 5210); the sand was a product from the Yahagi River, Aichi, and had a particle size (diameter) of 4 mm or less; the gravel was from Toba, Mie, and complied with the specifications of crushed stone 1505 (defined in JIS A 5505 as crushed stone for concrete, size: 5 mm to 15 mm); and the reducing agent was a 1:1 (by weight) mixture of sodium sulfite and sodium thiosulfate.

Using "Alibar 240" (a product of Alibar Co., Ltd.) as the spray machine, the principal composition was supplied through a 100 m long flexible hose feed pipe (i.d., 50 mm) for the transportation of concrete with air being supplied at a pressure of 6 kgf/cm$^2$ and at a rate of 10 m$^3$/min.

To the principal composition were added a 30 wt % aqueous solution of (meth)acrylate consisting of a 4:1 (by weight) mixture of magnesium acrylate and calcium acrylate as set accelerating agents and a 20 wt % aqueous solution of ammonium persulfate as an oxidizing agent in the following manner. That is, the mixture of set accelerating and oxidizing agents in aqueous solution was supplied with a pump through four supply pipes that were connected to the feed pipe equally spaced around the feed pipe at a position 50 cm behind the tip of the nozzle. Each of the four supply pipes formed a supply angle of 45 degrees with respect to the direction in which the principal composition was flowing, and resulted in flows crossed one another within the feed pipe where the aqueous solutions of set accelerating and oxidizing agents were mixed with the principal composition. With the linear speed of the supply of the set accelerating agent being varied at 0.3, 0.5, 1.0, 10, 30, 50 and 70 m/sec, 2 m$^3$ of a concrete formulation was sprayed onto vertical concrete slabs at the rate of 100 kg/min, and the miscibility of the set accelerating agent with the principal composition, the formation of cement dust during the spraying operation and the clogging of the nozzle were visually checked. The results are shown in Table 2.

TABLE 1

| Principal composition | | | | Set accelerating | Oxidizing | |
|---|---|---|---|---|---|---|
| cement | river sand | gravel | reducing agent | agent | agent (aq. sol.) | Water |
| 420 kg | 1180 kg | 590 kg | 3.0 kg | 84 kg | 15 kg | 143 kg |

TABLE 2

| | Linear speed (m/sec) | | | | | | |
|---|---|---|---|---|---|---|---|
| | 0.3 | 0.5 | 1.0 | 10 | 30 | 50 | 70 |
| Miscibility | very poor | good | good | good | good | good | poor |
| cement dust | many | few | few | few | few | few | many |
| Nozzle clogging | occurred gradually | negligible | none | none | none | none | negligible | occurred gradually |

As Table 2 shows, the set accelerating agent did not mix well with the principal composition when it was supplied at a linear speed of 0.3 m/sec; further, the reaction product of the principal composition and the set accelerating agent was gradually deposited on the walls of the nozzle and finally the nozzle was completely clogged. When the linear speed of the set accelerating agent exceeded 50 m/sec, the walls of the nozzle wore so extensively that it was difficult to perform spraying in a large volume.

EXAMPLE 2

A spray test was conducted using a mixture according to the formulation shown in Table 3. The cement and river sand were the same as those used in Example 1. The set accelerating agent was a 35 wt % aqueous solution of magnesium acrylate, the oxidizing agent was a 20 wt % aqueous solution of sodium persulfate, and the reducing agent was sodium isoascorbate dispersed in 1 l of water for addition to the principal composition.

Using "SOVA-III" (a product of Plibrico Japan Co., Ltd.) as the spray machine, the principal composition was supplied through a 60 m long flexible hose or feed pipe (i.d., 38 mm) for the transportation of mortar with air being supplied at a pressure of 4 kgf/cm$^2$ and at a rate of 7 m$^3$/min.

The mixture of set accelerating and oxidizing agent in aqueous solution was supplied at a linear speed of 1 m/sec with a snake-type non-pulsating metering pump through two supply pipes that were connected to the feed pipe at a position 25 cm behind the tip of the nozzle the nozzle in such a manner that extended axes of the supply pipes crossed each other within the feed pipe where the aqueous solutions of set accelerating and oxidizing agent were mixed with the principal composition. With the supply angle of the set accelerating agent being adjusted at 20, 30, 45, 60, 70, 80, 90 and 100 degrees with respect to the direction in which the principal composition was supplied, 1 m³ of a mortar formulation was sprayed onto vertical concrete slabs and the percent of rebounding was calculated according to the equation shown below, and the miscibility of the set accelerating agent with the principal composition, the formation of cement dust during the spraying operation and clogging of the nozzle were visually checked. The results are shown in Table 4.

$$\text{Percent of rebounding} = \frac{\text{Amount of spray material not adhered on concrete slab}}{\text{Amount of spray material sprayed onto concrete slab}} \times 100$$

TABLE 3

| | Principal composition | | Set accelerating agent | Oxidizing agent (aq. sol.) | Water |
|---|---|---|---|---|---|
| cement | river sand | reducing agent | | | |
| 420 kg | 1680 kg | 4.0 kg | 138 kg | 25 kg | 115 kg |

TABLE 4

| | Supply angle (degrees) | | | | | | | |
|---|---|---|---|---|---|---|---|---|
| | 20 | 30 | 45 | 60 | 70 | 80 | 90 | 100 |
| Percent of rebounding (%) | 40 | 22 | 15 | 13 | 20 | 28 | 36 | * |
| Nozzle clogging | none | none | none | none | none | none | none | clogged very soon |
| Miscibility | very poor | good | good | good | good | good | poor | very poor |
| Cement dust | many | few | very few | very few | very few | few | few | extensive |

*not measured because of clogging of nozzle

As Table 4 shows, when the supply angle was less than 30 degrees, the spray material was ejected from the nozzle before the principal composition was thoroughly mixed with the set accelerating agent in solution and, as a result, many cement dust formed during the spraying operation. On the other hand, when the supply angle was 30 degrees or more, good miscibility was achieved and the amount of cement dust markedly decreased. If the supply angle was greater than 90 degrees, the set accelerating agent was supplied in a direction opposite to that of the feed of the principal composition and the nozzle frequently clogged.

EXAMPLE 3

A spray test was conducted in accordance with the specifications of Example 2 for the case where the number of supply pipes was 1, 2, 4, 6 or 8 with the set accelerating agent being supplied at 45 degrees and at a linear speed of 1.0 m/sec. When only one supply pipe was used, the nozzle was clogged soon after the spraying was started, thus making it impossible to continue the spraying operation. With two or more supply pipes, the formation of cement dust during the spraying operation was limited and spraying operations could be achieved with the percent of rebounding of 20% or less.

EXAMPLE 4

Using two supply pipes for the set accelerating agent, a spray test was conducted in accordance with the specifications of Example 2 for the case where the distance from the tip of the nozzle to each supply pipe was 0.1, 0.2, 0.4, 0.8, 1 and 1.5 m, with the weight ratio of the set accelerating agent to the principal composition being adjusted to 0.010 on a solids basis. When the distance from the tip of the nozzle to each supply pipe was 1.5 m, the nozzle was clogged immediately after the start of the spraying operation. No such problem occurred in the other cases.

EXAMPLE 5

A spray test was conducted in accordance with the specifications of Example 3 for the case where the weight ratio of the set accelerating agent to the principal composition being 0.005, 0.009, 0.010, 0.5, 0.6 or 0.9 on a solids basis. When the weight ratio was 0.005, the hardened cement was very fragile and could be easily crushed by hand. When the weight ratio was 0.9, it took more than one minute for the spray material to harden and the hardened cement contained too much resin to exhibit satisfactory hardness.

In accordance with the method of the present invention, the hardened product made of the (meth)acrylate and cement will adhere to a desired substrate within a short period of time with sufficient strength to effectively protect structural bodies. Thus, the method of the present invention is useful for the purpose of repairing structures. Further, the method causes minimum rebounding of the spray material and enables spraying to be accomplished in a consistent reproducible manner with minimum problems such as clogging of the nozzle and, as a result, structures can be repaired in an efficient and economical manner by the method of the present invention.

While the invention has been described in detail and with reference to specific embodiments thereof, it will be apparent to one skilled in the art that various changes and modifications can be made therein without departing from the spirit and scope thereof.

What is claimed is:

1. In a method of applying a quick setting spray material comprising (i) a cement-containing principal composition containing water and (ii) a set accelerating agent comprising an aqueous solution of at least one of acrylates and methacrylates, the improvement wherein the principal composition is supplied into a feed pipe and sprayed through a nozzle and the set accelerating agent is supplied into the principal composition at a linear speed of 1.0 to 30 m/sec through at least two supply pipes that are connected to the feed pipe in a position within one meter behind the tip of the nozzle for the spray material in such a manner that extended axes of the supply pipes cross each other within the feed pipe and wherein the at least two supply pipes form a supply angle of 30 to 90 degrees with respect to the direction at which the principal composition flows, whereafter the principal composition and the set accelerating agent are jetted from the nozzle.

2. The method as in claim 1, wherein said supply angle is from 30 to 70 degrees.

3. The method as in claim 1, wherein said at least two supply pipes are connected to the feed pipe in a position between 5 cm to 1 m behind the tip of the nozzle.

4. The method as in claim 1, wherein said extended axes of the supply pipes cross each other within the region around the center of the feed pipe at a distance therefrom of not more than 20% of the inner diameter of the feed pipe.

5. The method as in claim 1, wherein said quick setting spray material is hardened within no more than 30 seconds.

6. The method as in claim 1, wherein said quick setting spray material is hardened within 10 seconds.

* * * * *